(12) United States Patent
Kim et al.

(10) Patent No.: US 12,095,521 B2
(45) Date of Patent: Sep. 17, 2024

(54) COMMUNICATION-BASED PHYSICAL MEDIA MONITORING

(71) Applicant: TEXAS INSTRUMENTS INCORPORATED, Dallas, TX (US)

(72) Inventors: Wonsoo Kim, Allen, TX (US); Il Han Kim, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/902,361

(22) Filed: Jun. 16, 2020

(65) Prior Publication Data

US 2020/0382163 A1    Dec. 3, 2020

Related U.S. Application Data

(63) Continuation of application No. 15/196,495, filed on Jun. 29, 2016, now Pat. No. 10,700,740.

(51) Int. Cl.
| | |
|---|---|
| *H04L 43/16* | (2022.01) |
| *H04B 3/54* | (2006.01) |
| *H04L 41/0659* | (2022.01) |
| *H04L 41/0677* | (2022.01) |
| *H04L 43/08* | (2022.01) |
| *H04L 43/0823* | (2022.01) |

(52) U.S. Cl.
CPC ........... *H04B 3/54* (2013.01); *H04L 41/0659* (2013.01); *H04L 41/0677* (2013.01); *H04L 43/08* (2013.01); *H04L 43/0847* (2013.01); *H04L 43/16* (2013.01)

(58) Field of Classification Search
CPC .............. H04B 1/1027; H04L 41/0659; H04L 41/0677; H04L 43/08; H04L 43/0847; H04L 43/16
See application file for complete search history.

(56) References Cited

U.S. PATENT DOCUMENTS

| | | | |
|---|---|---|---|
| 10,091,101 B2 * | 10/2018 | Vedantham | ............. H04L 45/70 |
| 2011/0045761 A1 | 2/2011 | Rolf et al. | |
| 2012/0075987 A1 * | 3/2012 | Yoneyama | ............ H04W 24/04 |
| | | | 370/216 |
| 2012/0172673 A1 | 7/2012 | Friedman et al. | |
| 2013/0308937 A1 | 11/2013 | Pohlmann et al. | |
| 2014/0036702 A1 | 2/2014 | Van Wyk et al. | |
| 2014/0105043 A1 | 4/2014 | Reves Balleste et al. | |

(Continued)

*Primary Examiner* — Jason D Recek
(74) *Attorney, Agent, or Firm* — Mandy Barsilai Fernandez; Frank D. Cimino

(57) ABSTRACT

A communication system and method includes a receiver for receiving a communication signal coupled through a physical medium in accordance with a protocol. An interface formed in a single substrate receives from the receiver an indication of the signal strength of the received communication signal. The interface also decodes the information contained in the received communication signal. For example, the interface sends the information decoded from the received communication signal to a first application for consuming the decoded information. The interface also sends the indication of the signal strength of the received communication signal to a second application for generating a quality determination of the physical medium in response to the indication of the signal strength of the received communication signal.

18 Claims, 5 Drawing Sheets

(56) References Cited

U.S. PATENT DOCUMENTS

| | | |
|---|---|---|
| 2014/0269341 A1 | 9/2014 | Gunasekara et al. |
| 2014/0321294 A1 | 10/2014 | Nagel et al. |
| 2015/0065032 A1 | 3/2015 | Lin et al. |
| 2015/0221194 A1* | 8/2015 | Sarkar ................ G08B 13/2465 340/870.16 |
| 2016/0352801 A1* | 12/2016 | Krishna ................. H04L 43/16 |
| 2017/0070919 A1* | 3/2017 | Verger ................ H04L 65/1083 |
| 2017/0366296 A1 | 12/2017 | Stanciu et al. |

* cited by examiner

COMMUNICATION-BASED PHYSICAL MEDIA MONITORING

CROSS-REFERENCE TO RELATED APPLICATIONS

This application is a continuation of U.S. patent application Ser. No. 15/196,495, filed Jun. 29, 2016, which is incorporated by reference herein in its entirety.

BACKGROUND

Utilities are increasingly using networked meters to reduce meter-reading costs and to monitor user consumption in real-time. Networking applications such as power line communications (PLC) typically use the TCP/IP (transmission control protocol/internet protocol) stack architecture to transmit and receive information from the networked meters. However, the physical media over which the PLC communications are conducted is not always available and/or subject to degradation, which interrupts the ability of a utility to reliably obtain information from the networked meters.

SUMMARY

The problems noted above can be addressed in a communication system and method for performing communication-based physical media monitoring. For example, a communication system and method includes a receiver for receiving a communication signal coupled through a physical medium in accordance with a protocol. An interface formed in a single substrate receives from the receiver an indication of the signal strength of the received communication signal. The interface also decodes the information contained in the received communication signal. The interface sends the indication of the signal strength of the received communication signal to a second application for generating a quality determination of the physical medium in response to the indication of the signal strength of the received communication signal. In various embodiments, the interface also sends the information decoded from the received communication signal to a first application for consuming the decoded information.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion.

Figure 1:
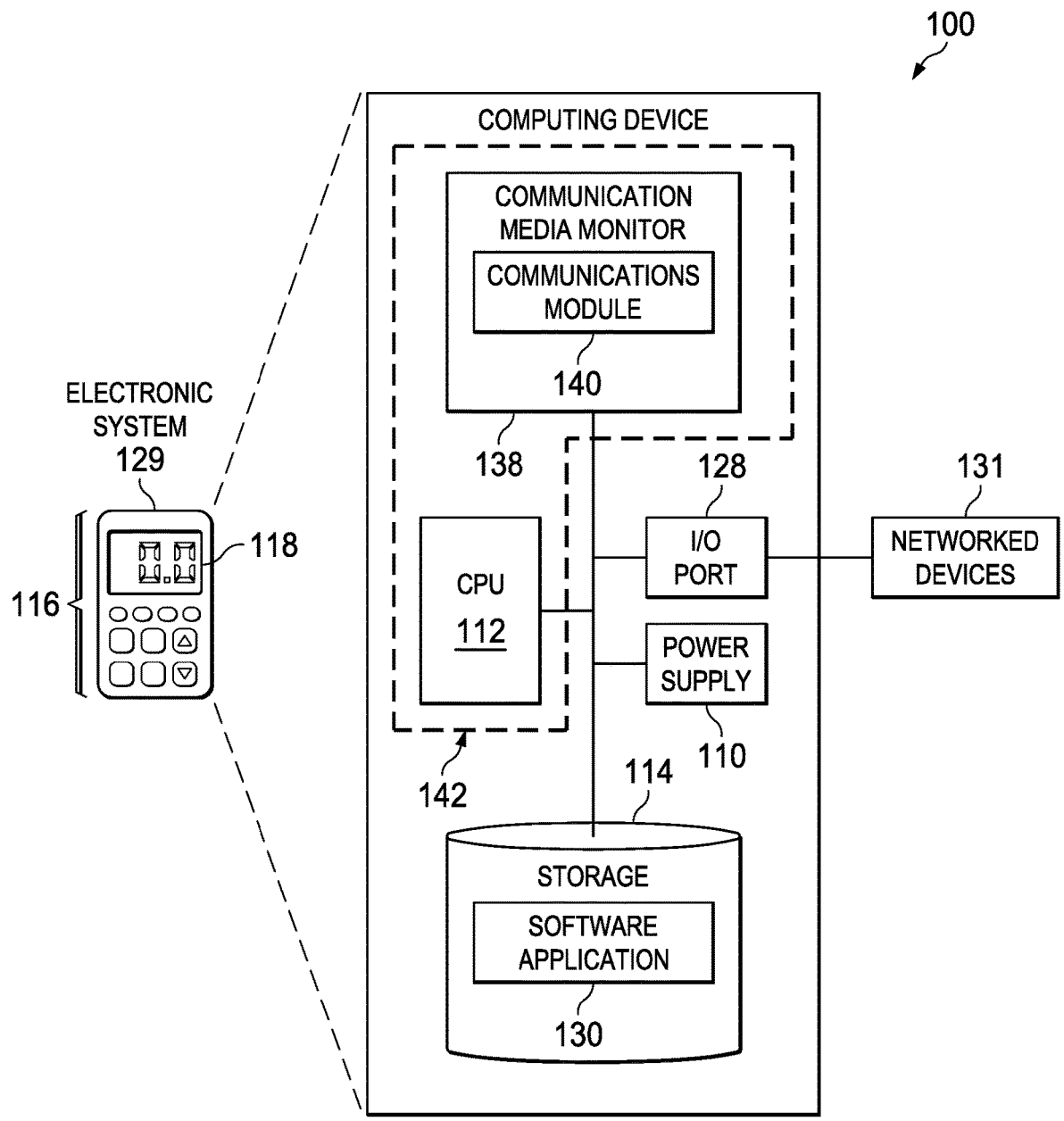
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or display, communications equipment (including transmitters), or any other type of electronic system arranged to generate networking signals.

In some embodiments, the computing device 100 comprises a megacell or a system-on-chip (SoC) which includes control logic components such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The CPU 112 includes functionality provided by discrete logic components and/or is arranged to execute application-specific instructions that, when executed by the CPU 112, transform the CPU 112 into a special-purpose machine. The storage 114 (which can be memory such as on-processor cache, off-processor cache, RAM, flash memory, data registers, flip-flops, disk storage, and the like) stores one or more software applications 130

(e.g., embedded applications) that, when executed by the CPU 112, perform any suitable function associated with the computing device 100.

The CPU 112 comprises memory and logic that store information frequently accessed (e.g., written to and/or read from) from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device (including "smart meters" or base-station control units that are electronically paired with the computing device 100) capable of point-to-point and/or networked communications with the computing device 100. The computing device 100 is optionally coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 can be coupled to an external power supply (not shown) or coupled to a local power source (such as a battery, solar cell, alternator, inductive field, fuel cell, capacitor, and the like).

The disclosed communication-based physical media monitoring techniques include, for example, an embedded (e.g., existing) communication interface (for controlling communication across a physical medium), which is shared between target applications (e.g., for monitoring utility usage) and support applications (e.g., for monitoring the quality of communications across a medium). The illustrated embodiments include architectures for determining media communications quality (e.g., signal strength and signal noise) using the (e.g., shared) communication interface and protocols for conducting communications between two or more nodes. The illustrated embodiments include architectures that demonstrate distributed communications between two or more nodes for providing network-specific information for fault isolation within a given networks.

The computing system 100 includes a smart meter 142 arranged to receive and transmit packet-based communications based on the OSI (open-systems interconnection) model (e.g., layered protocol stack). The smart meter 142 is arranged to conduct power line communications (PLC) over a physical medium and includes a communication media monitor 142 operable to monitor (e.g., assess the quality and/or presence of) such communications. The communication media monitor 142 is arranged, for example, to place function calls to the communications module 140 to determine a quality of communications across a physical medium. The quality of communications across a physical medium can be determined in response to signal and noise measurements performed by the communications module 140 such that, for example, maintenance information for specific nodes can be indicated. The communications module 140 is an interface commonly available in a protocol "stack" of a smart meter operable to conduct packet-based communications (e.g., sending and receiving packets across the physical medium) of target applications such as utility monitoring applications.

Figure 2:
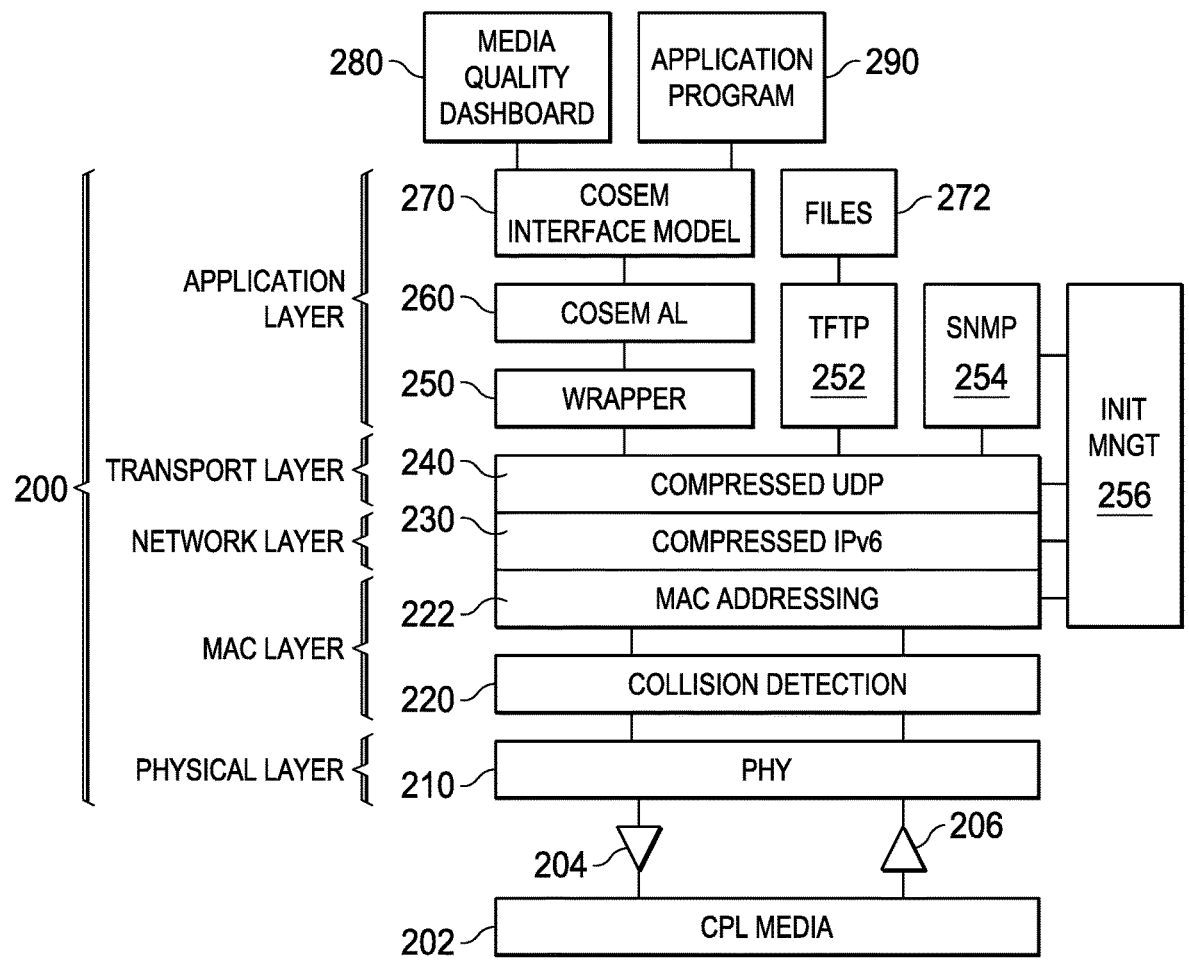
FIG. 2 is a block diagram illustrating a network architecture Open Systems Interface (OSI) model for communication-based physical media monitoring in accordance with embodiments of the present disclosure.

FIG. 2 is a block diagram illustrating a network architecture Open Systems Interface (OSI) model for communication-based physical media monitoring in accordance with embodiments of the present disclosure. Network stack 200 is a network stack organized in accordance with a G3-PLC (powerline communications) protocol stack. The network stack 200 is illustrative and can optionally use various selected protocols that differ from the illustrated protocols. For example, a TCP (transport control) protocol can be used in place of the UDP (user datagram) protocol.

The network stack 200 is illustrated as having five layers: the physical layer, the MAC layer, the network layer, the transport layer, and the application layer. The layers can be embodied as strictly hardware (e.g., at one or more lower levels) or as "software" (e.g., by hardware configured by and/or controlled by functional data stored in memory, where such configuration and control is operable to transform general purpose hardware components into a specific machine for accomplishing a purpose encoded in the stored functional data). Generally, the functionality provided by lower layers tends to be implemented more by using hardware (including exclusively using hardware), whereas the functionality provided by the higher layers tends to be implemented more by using software acting upon the hardware of the lower layers.

The physical layer includes physical layer (PHY) 210 that is coupled to a physical medium via coupler (CPL) 202. The physical layer is operable to transmit and receive information across a physical medium. The physical medium can be wireless (e.g., transmitted and received via sound, radio frequency waves, light, and the like) or cabled (e.g., transmitted and received via electrical lines, fiber optic cables, waveguide, and the like).

For example, the media coupler 202 includes (and/or is coupled to) a transmitter 204 and a receiver 206. The transmitter 204 is arranged to drive and/or modulate line power (e.g., 60 Hz, 120 volts) such that information is encoded on the line power (e.g., using high frequency modulation) without substantially reducing the energy of the line power. Accordingly, a power line (e.g., when so coupled also) functions as a physical medium coupled to a network stack 200. The receiver 206 is arranged to buffer and/or demodulate the encoded line power such that the information used to encode the line power is forwarded to the network stack for processing.

The MAC (media access control) layer includes, for example, MAC addressing 222 sublayer protocols for moving data packets between a first network entity (having a first unique physical address) and a second network entity (having a second unique physical address). The collision detection 220 MAC sublayer is operable to perform collision detection such that simultaneous transmission of communication from different (e.g., asynchronous) network entities is minimized. In an embodiment, an indication of a collision detection is used to invalidate a received packet signal strength measurement used for generating a quality determination of the physical medium by which the measured packet is received.

The network layer includes the compressed IPv6 (Internet protocol version six) layer 230. The compressed IPv6 layer 230 is operable to deliver data packets from a source network entity to a destination network entity in accordance with IP (internet protocol) addresses associated with particular data packets.

The transport layer includes the UDP (user datagram protocol) layer 240. The UDP layer 240 is operable to establish and terminate temporary communication sessions between two application programs. As disclosed herein, the UDP layer 240 is responsive to both a prime application (e.g., a metering application such as application program 290) and a support/logistical application (e.g., medium quality application such as media quality dashboard 280).

The application layer includes the wrapper 250, the COSEM (companion specification for energy metering) application layer 260, the COSEM interface model 270, the TFTP (trivial file transfer protocol) 252, the SNMP (simple network time protocol) 254, and files 272. The initialization manager (INIT MNGT) 256 is operable for initializing the logical states of the various layers and sublayers. As disclosed herein, application program 290 (e.g., for remote metering) and media quality dashboard 380 (e.g., for physical media monitoring) access the physical medium through a common path (e.g., via MAC sublevel 220 and physical layer 210).

Figure 3:
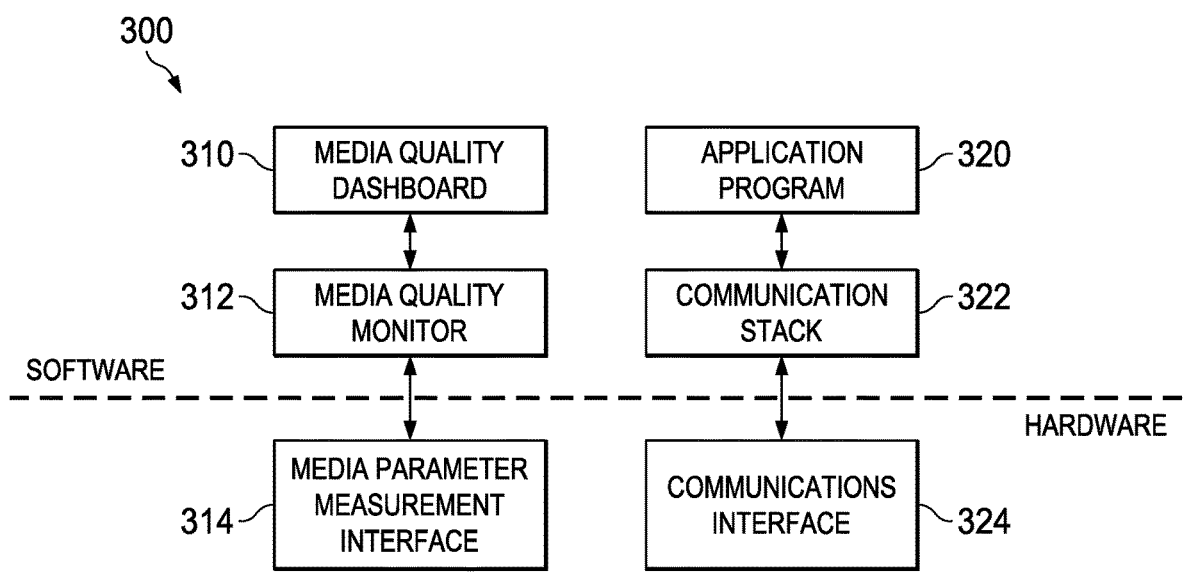
FIG. 3 is a block diagram illustrating layers of a conventional protocol stack for performing metering applications and for performing media quality applications.

FIG. 3 is a block diagram illustrating layers of a conventional protocol stack for performing metering applications and for performing media quality applications. Remote metering and physical media monitoring system 300 typically resides in an electronic meter and includes a media quality dashboard 310 (e.g., for physical media monitoring) and an application program 320 (e.g., for remote metering).

As introduced above, the functionality of the higher layers of a protocol stack tend to be implemented using more of a software (SW) approach whereas functionality of the lower layers of the protocol stack 200 to be implemented using an approach that includes more hardware (HW) and less (if any) software. The notional line of "division" between hardware and software is a design choice that (e.g., selectively) varies depending on various tradeoffs including cost, power dissipation, reliability, time to market, and the like. Accordingly, the functionality provided for controlling the remote metering and physical media monitoring system 300 can be entirely embodied as hardware (e.g., when designers are given sufficient resources).

The media quality dashboard 310 is an (e.g., support/test) application program used to determine the quality level of the operation of physical media coupled to an electronic meter (e.g., networked within a "smart grid" of a utility) in which the remote metering and physical media monitoring system 300 resides. For example, the media quality dashboard 310 notifies the media quality monitor 312 that a physical medium (e.g., to which the remote metering and physical media monitoring system 300 is coupled) is to be monitored. In response, the media quality monitor 312 programs the media parameter measurement interface 314 (which is implemented using hardware) to perform physical quality tests (e.g., such as resistance, current, voltage, and other like measurements) upon the physical medium be monitored.

The application program 320 is an (e.g., prime) application program used to perform remote metering of the electronic meter in which 300 resides the remote metering and physical media monitoring system. For example, the application program 320 instructs the communication stack 322 to send a packet (e.g., which includes utility usage information) across the physical medium to be monitored. In response, the communications stack 322 refers the received packet to the communications interface 324 (which is implemented using hardware) to be forwarded to a utility gateway such that the utility usage indicated by the electronic meter (e.g., in which the remote metering and physical media monitoring system 300 resides) is remotely monitored by the utility.

The media parameter measurement interface 314 and a communications interface 324 are conventionally embodied within separate substrates (e.g., in different chips). The media parameter measurement interface 314 and the communication interface 324 are normally embodied in separate substrates due to, for example, differences in technology used to implement the respective functions as well as the differences between the application-specific measuring functions of the media parameter measurement interface 314 and the communications-focused functions of the communication interface 324.

Figure 4:
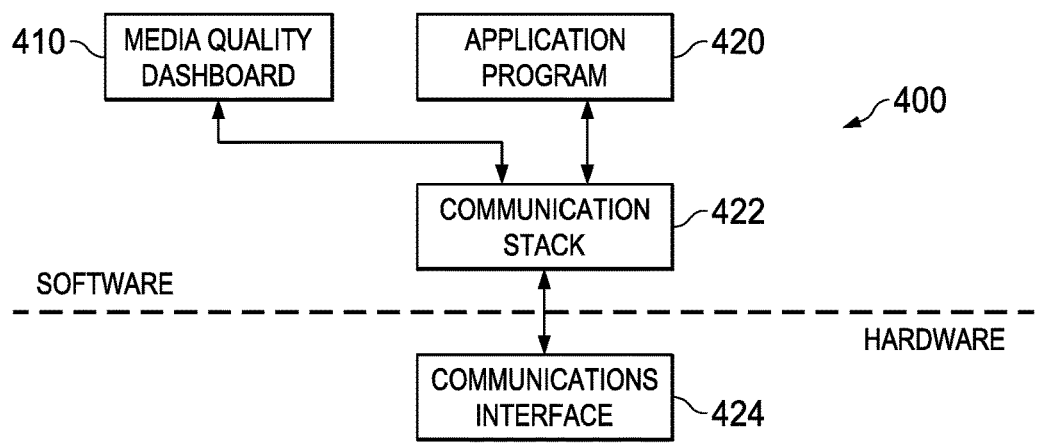
FIG. 4 is a block diagram illustrating layers of a protocol stack for communication-based physical media monitoring in accordance with embodiments of the present disclosure.

FIG. 4 is a block diagram illustrating layers of a protocol stack for communication-based physical media monitoring in accordance with embodiments of the present disclosure. Remote metering and physical media monitoring system 400 typically resides in an electronic meter and includes a media quality dashboard 410 (e.g., for physical media monitoring) and an application program 420 (e.g., for remote metering).

As mentioned above, the notional line of "division" between hardware and software is a design choice that (e.g., selectively) varies depending on various tradeoffs including cost, power dissipation, reliability, time to market, and the like. Accordingly, the functionality of any software used to control the remote metering and physical media monitoring system 400 can be entirely embodied as hardware (e.g., when given sufficient time and resources for design and manufacture).

The media quality dashboard 410 is an application program used to determine the quality level of operation of media coupled to electronic meter in which the remote metering and physical media monitoring system 400 resides. As disclosed herein, the media quality dashboard 410 queries the communication stack 422 as to the present quality of the transmissions across a physical medium (e.g., to which the remote metering and physical media monitoring system 400 is coupled). In response, the communication stack 422 queries the communication interface 424 (e.g., which is implemented using a single substrate) to perform logical and/or physical quality tests (e.g., such as bit checking, signal-to-noise ratio, and other like measurements) upon the physical medium (including transmissions conversing the physical medium) to be monitored.

The application program 420 is an application program used to perform remote metering of the electronic meter in which the remote metering and physical media monitoring system 400 resides. The application program 420 is arranged to send information for encoding and transmission to another node (such as a utility gateway) and to receive information decoded from communications received from another (e.g., metered or utility) node. For example, the application program 420 instructs the communication stack 422 to send a packet (e.g., a communication signal, which includes utility usage information) across the physical medium being monitored. In response, the communications stack 422 refers the received packet to the communications interface 424 (which is implemented using hardware) to be forwarded to a utility gateway such that the utility usage indicated by the electronic meter (e.g., in which the remote metering and physical media monitoring system 400 resides) is remotely monitored by the utility. Accordingly, the application program 420 can use the same communication stack 422 and communications interface 424 as queried by the media quality dashboard 410 (which, for example, can result in reduced complexity, reduced power dissipation, reduced cost, reduced layout area, and increased reliability). Further, the signal strength of packets used by application 420 in performing a prime function such as metering, can be used by the the media quality dashboard 410 to generate a quality determination without increasing network traffic. Such sharing of functionality can obviate the need for a special chip (e.g., on a separate substrate) that is dedicated to hardware-based measurement (which, for example, saves area, power, cost, and the like) for each electronic meter in which the remote metering and physical media monitoring system 400 resides.

Accordingly (e.g., and in contrast with conventional solutions), the functionality of the media quality dashboard 410 and the (e.g., remote metering) application program 420 is embodied within a single substrate (e.g., in the same chip). The media quality dashboard 410 is operable to determine the present quality level of a physical medium in response to querying the same communication stack 422 for information, which is normally accessible to the application program 420 (e.g., via a programming interface).

For example, the media quality dashboard 410 (as well as the application program 420) can query (e.g., by placing a function call) the communication stack 422 to determine a present (including a recently measured) value for a signal-to-noise ratio (SNR) and a receive signal strength index (RSSI) for determining the present quality level of the physical medium. In response to the query by the media quality dashboard 410, the communication stack 422 places SNR and RSSI function calls to the communications interface 424, where the present values of the SNR and RSSI are returned, for example as arguments.

The communications interface 424 is operable to determine values for SNR and the RSSI values (e.g., for a packet received by application program 420) and to return the determined values to the communication stack 422 for forwarding to the media quality dashboard 410.

The signal-to-noise ratio is determined in accordance with:

$$SNR = \frac{S}{N} \quad (1)$$

where S is the signal level and N is the noise level, while the received signal strength index is determined in accordance with:

$$RSSI = S + N \quad (2)$$

The media quality dashboard 410 is operable to determine the present quality level of the physical medium in response the returned values for the SNR and RSSI function calls. The present quality level is determined, for example, in accordance with electrical characteristics such as the signal strength and noise level associated with a received packet being used to determine the present quality level of the physical medium. The media quality dashboard 410 is operable to determine the signal strength S in accordance with:

$$S = \frac{SNR}{1 + SNR} RSSI \quad (3)$$

where Eq. (3) can be algebraically derived by combining Eq. (1) and Eq. (2).

In an embodiment, the communications interface 424 is arranged to determine a value for the SNR and the RSSI for each packet received by the communications interface 424. The communications interface 424 returns an indication of the SNR and the RSSI to the media quality dashboard 410. Accordingly, the media quality dashboard 410 is arranged to determine the present quality level of a physical medium associated with each received packet.

In another embodiment, an indication of the present quality level (e.g., determined signal strength) is included in a reporting communication signal (e.g., packet) from the media quality dashboard 410 via the transmitter 204 to a node (e.g., gateway 740, discussed below) for processing by a central control facility. The transmitter 204 transmits the reporting communication signal via through a portion of the physical medium in accordance with the network protocol. The reporting communication signal typically includes an indication of a (e.g., source) network address (e.g., IP and/or MAC address) for the network node associated with the media quality dashboard 410 and for the (e.g., tested) network node from which the packet used to test the physical medium was sent. The address of network node (e.g., from which the packet used to test the physical medium is received) is typically encoded as (and decoded from) packet information (e.g., sending address) within the packet used to test the physical medium. Accordingly, the reporting communication signal includes information identifying which portion of the physical medium is being tested (e.g., the portion between the sending address and the receiving address of the packet intended for receipt by the media quality dashboard 410). The reporting packet includes a destination address for the network node associated with a central control facility (and/or gateway of the central control facility).

In yet another embodiment, the larger portions of the physical medium can be tested by testing additional portions of the physical medium (e.g., where the additional portions are associated with a sending node address that is different from the address of a node previously used to test a portion of the physical medium). For example, the receiver 206 receives a communication signal (e.g., packet) from a second sending node such that lower portions of the network stack (e.g., coupled to the receiver 206) decodes the address of the second sending node as well as generates an indication of the signal strength (e.g., RSSI and SNR values) in response to the packet received from the second sending node. An indication of the present quality level (e.g., determined signal strength) of the packet received from the second sending node (as well as an indication of the decoded address of the second sending node) is included in a reporting communication signal (e.g., packet) from the media quality dashboard 410 via the transmitter 204 to a network node (e.g., gateway 740, discussed below) for processing by a central control facility.

In an even yet different embodiment, a portion (e.g., which includes the entire portion or less than the entire portion) of the functionality of the application program 420 is combined with the functionality of the media quality dashboard 410 without loss of functionality of either the application 420 or the media quality dashboard 410. Accordingly, the application program 420 is optionally arranged to perform media quality monitoring functions.

Figure 5:
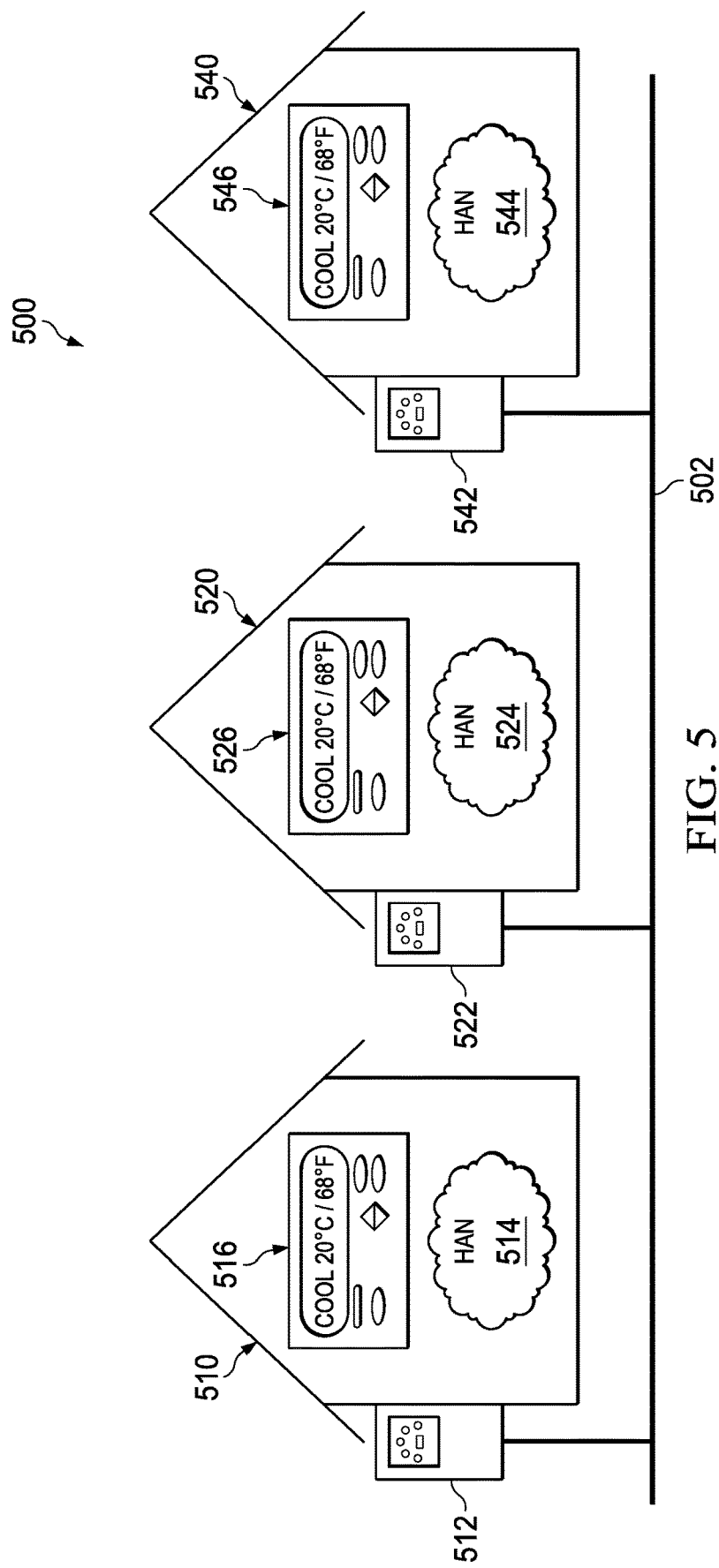
FIG. 5 is a block diagram illustrating metered nodes of a network having communication-based physical media monitoring in accordance with various embodiments of the disclosure.

FIG. 5 is a block diagram illustrating metered nodes of a network having communication-based physical media monitoring in accordance with various embodiments of the disclosure. The neighborhood 500 includes houses 510, 520, and 530. For purposes of illustration, three houses are shown: the neighborhood 500 optionally includes more or less houses (although typically many more). The neighborhood 500 is a neighborhood of houses served by a utility 540 (e.g., which can provide power, gas, and water, as well as providing metered access to an arbitrary supplied commodity). The communication-based physical media monitoring smart meters 512, 522, and 542 are network nodes coupled, for example, to measure (e.g., "to meter") and electronically report the amount of the commodity supplied by the utility that is consumed by the respective house (e.g., for the benefit of the respective occupants of each house).

The smart meters are network nodes, which "neighbor" (e.g., "are logically adjacent to") other neighboring nodes on a node-wise basis (e.g., in accordance with physical media connecting/coupling adjacent nodes as neighbors). Accordingly, the neighboring nodes are usually geographically situated closely to other nodes closely coupled in a network (such as smart meters within a particular housing development). However, power line communication signal strength typically decreases as a function of distance, so the term "neighboring nodes" can relate to any group of nodes for which power line communications is (e.g., in the absence of underperformance) generally expected to be possible relative to a given node.

The house 510 includes a communication-based physical media monitoring smart meter 512, a personal area network (such as a home area network 514), and a home appliance 516. The home appliance 516 is arranged for communicating with the communication-based physical media monitoring smart meter 512 via HAN (home area network) 514 and/or power line 502. The HAN 514 is a network such as a home network for controlling and/or monitoring home appliances using, for example, power line communications.

The communication-based physical media monitoring smart meter 512 is operable for communicating with a utility (e.g., control center 750 discussed below with reference to FIG. 7) as well as one or more adjacent houses (e.g., house 520, house 540, as well as other houses). As disclosed herein, each a communication-based physical media monitoring smart meter (e.g., 512, 522, and 542) is operable to monitor the quality level of a portion of the physical medium 502, which is coupled to each of the illustrated houses. (As discussed below with reference to FIG. 7, other network topologies are possible.)

The house 520 includes a communication-based physical media monitoring smart meter 522, a personal area network (such as a HAN 524), and a home appliance 526, where the monitoring smart meter 522, a personal area network (such as a HAN 524), and a home appliance 526 operates in a similar manner to the respective components of house 510. For example, the communication-based physical media monitoring smart meter 522 is operable to communicate with the utility, as well as adjacent houses (such as house 510 and house 540), across physical medium 502.

The house 540 includes a communication-based physical media monitoring smart meter 542, a personal area network (such as a HAN 544), and a home appliance 546, where the monitoring smart meter 542, a personal area network (such as a HAN 544), and a home appliance 546 operates in a similar manner to the respective components of house 510. For example, the communication-based physical media monitoring smart meter 542 is operable to communicate with the utility, as well as adjacent houses (such as house 510 and house 520), across physical medium 502.

The communication-based physical media monitoring smart meter smart meters (512, 522, and 524) are operable to provide location information of malfunctioning (including weak, intermittently operable and/or inoperable) portions of physical medium 502. The provided location information (e.g., which provides an indication of a geographical location of a malfunctioning portion of a network between two nodes) is used to fault isolate one or more malfunctioning portions of the physical medium 502 as discussed below with reference to FIG. 6 and FIG. 7.

Figure 6:
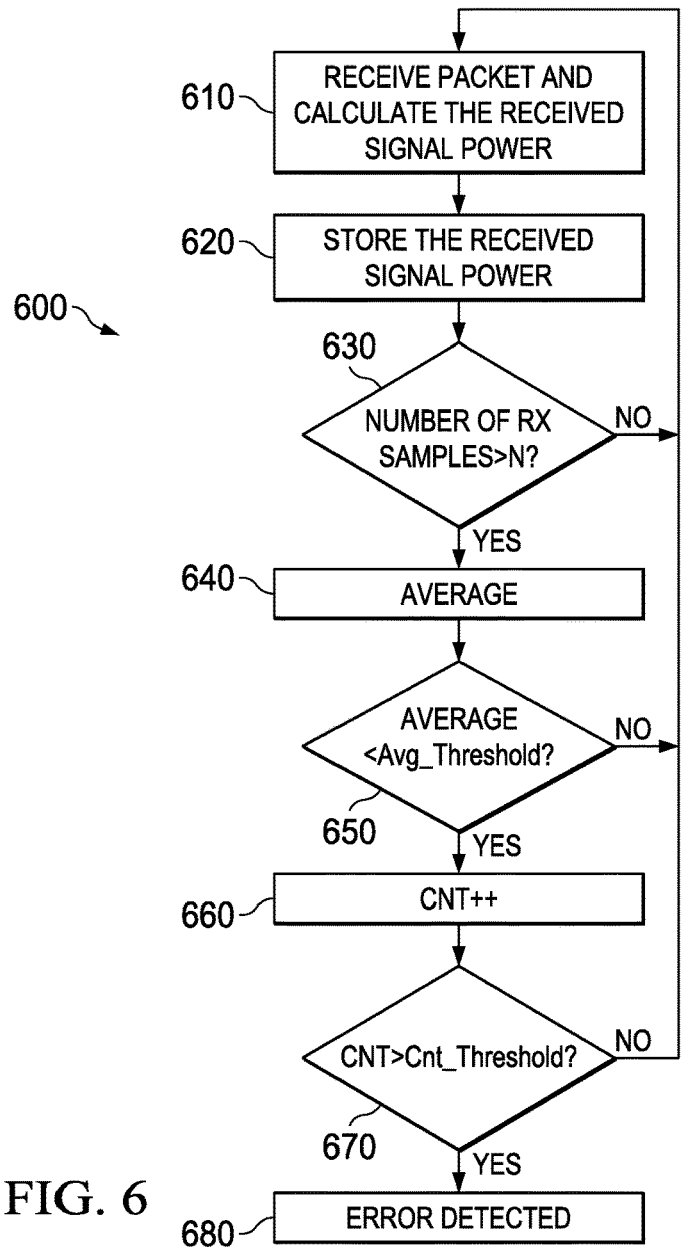
FIG. 6 is a flow diagram illustrating communication-based physical media monitoring in accordance with various embodiments of the disclosure.

FIG. 6 is a flow diagram illustrating communication-based physical media monitoring in accordance with various embodiments of the disclosure. The example flow 600 for communication-based physical media monitoring is typically performed by various smart meters (such as smart meters 512, 522, and 524) logically connected (e.g., as in network connections) on a network (e.g., smart grid).

Data from multiple related smart meters typically provides indications of the locations of any underperforming (such as malfunctioning, intermittent, worsening, noisy, disintegrating, and the like) portion of the physical media (e.g., communication path between two nodes) of a network. Accordingly, the communication-based physical media monitoring data can be (e.g., semi-) autonomously (e.g., by the nodes primarily, as compared against complete performance by a central control facility) generated and transferred to a central location for processing. The processing can include isolating fault location(s) and scheduling maintenance and/or repair for underperforming paths of the physical media of the network.

Flow 600 for communication-based physical media monitoring is initiated (e.g., under control of a processor executing instructions selected for transforming a portion of the system controlled by the processor into a special-purpose system, machine, and/or circuit specific for communication-based physical media monitoring) by entering operation 610. As discussed above, operation 610 can be entered in response to an instant node receiving a (network communication) packet from a neighboring node (e.g., for which communication-based physical media monitoring is to be performed on the physical medium used in logically connecting the instant node and the neighboring node).

In operation 610, a packet is received from a neighboring node and the signal strength (e.g., power) associated with the received packet is determined. For example, the signal strength is determined by placing SNR and RSSI function calls to the communication layer to retrieve the signal-to-noise ratio and the received signal strength index associated with the received packet. The signal-to-noise ratio and the received signal strength index are used to determine the signal-strength, for example, in accordance with Eq. (3) described above. Optionally, the initiation of the transmission of the packet received from the neighboring node can be initiated by the neighboring node (e.g., as part of a monitoring process executed by the neighboring node) or can be initiated in response to a ping by the receiving node (e.g., as part of a monitoring process executed by the receiving node). Program flow proceeds to operation 620.

In operation 620, the determined (e.g., calculated) signal strength of the received packet is stored. The calculated value for the received signal strength can be stored as data in scratch pad memory or in long-term nonvolatile memory, and/or transmitted to another network node (e.g., another smart meter and/or central control facility) for purposes of storing, forwarding, and/or processing. In various embodiments, the forwarded data (e.g., any value received and/or calculated by a processor executing a flow 600) can be processed by processors of other network nodes in accordance with teachings disclosed herein for flow 600. For example, various operations of flow 600 can be executed by processors of other network nodes, where communication-based physical media monitoring data used (and/or generated by) the distributed processing is forwarded to a central location such as the central control facility. The program flow proceeds to operation 630.

In operation 630, the number of signal-strength samples calculated in response to received packets from the neighboring node is compared with the value N, where N is the number of signal-strength samples in a window used for averaging calculated signal-strength samples. When the number of signal-strength samples does not exceed N, the program flow proceeds to operation 610 (e.g., for increasing the number of signal-strength samples). When the number of signal-strength samples is greater than N, the program flow proceeds to operation 640.

In operation 640, an average (and/or other suitable mathematical result such as mean) is calculated in response to the signal-strength samples that lie within the sampling window defined by N. For example, averaging is performed to generate an averaged indication, which "averages out" effects of transient conditions (such as packet collisions, power surges, and the like) that do not necessarily impeach the quality of the physical medium itself. Accordingly, the value of N is selected in view of the various durations of such possible transient conditions. Program flow proceeds to operation 650.

In operation 650, the calculated average is compared with a signal strength (e.g., average) threshold value (Avg_Threshold), where the average threshold value is selected in accordance with a particular kind of failure mode. For example, different average threshold values can be selected for determining errors (including determining "underperformance") related to various failure modes including conditions and faults such as opens, shorts, network traffic saturation and collisions, water intrusion, and the like. Accordingly, multiple comparisons of the calculated average can be made using different average threshold values for respective error conditions.

When the calculated average is less than a particular average threshold value, program flow proceeds to operation 610 for further sampling during a sampling window. Because differing kinds of average threshold values exist, a single processor (or multiple processors of a single smart meter) can execute multiple simultaneous flows 600, wherein each flow 600 is associated with a particular kind of average threshold value (e.g., such that independent program flow control is used for each such flow 600). When the calculated average is greater than or equal to the particular average threshold value, program flow proceeds to operation 660.

In operation 660, a count (CNT) value is incremented each time a calculated average exceeds the particular average threshold value. For example, the count value is stored (and/or promulgated to the central control facility as discussed below with reference to FIG. 7). Program flow proceeds to operation 670.

In operation 670, the count value is compared with a count threshold value (Cnt_Threshold), where the count threshold value is selected in accordance with a particular kind of failure. For example, different average threshold values can be provided for determining errors (including determining "underperformance") related to various conditions and faults such as opens, shorts, network traffic saturation, water intrusion, and the like. Accordingly, comparisons of the count value can be made using different average threshold values for respective error conditions. (In an embodiment, the value of count is reset periodically and/or in accordance with a length of time determined from the time(s) of one or more previously determined errors.)

When the count value is less than or equal to a particular count threshold value, program flow proceeds to operation 610 for further sampling during a sampling window and for determination of additional occurrences of the condition where the calculated average is less than a particular average threshold value. When the count value is greater than the particular count threshold value, program flow proceeds to operation 680.

In operation 680, the presence of an error (and/or underperformance) is detected in response to the count value exceeding the particular count threshold value. When the presence of the error is detected, a notification (e.g., such as a reporting packet sent for forwarding the central control 750) is made in accordance with a signal strength comparison result (e.g., a result of comparisons performed in operation 670). For example, the determined error (and/or underperformance) is stored in memory and the signal strength comparison result is promulgated to the central control facility as discussed below with reference to FIG. 7). Optionally, an indication of the detected error is displayed on a user interface of the instant node (e.g., of the associated smart meter) and/or the central control facility. Program flow optionally terminates, proceeds to operation 610, or proceeds to a maintenance routine executed in response to the detected error.

The values of N (window for average), Avg_Threshold, and Cnt_Threshold values can be initially provided as fixed values (e.g., that are subject to optional configuration changes in the future). The user-configurable options can be changed over time to adapt to changes in the environment of a physical medium, and/or changed at a point in time to reflect a change in a particular kind of physical medium (e.g., such as when a power cable is changed and/or replaced).

It can be seen that various operations of flow 600 can be reordered, combined, and/or changed (e.g., in accordance with well-known algebraic principles) to provide error detection of physical media in a similar manner as flow 600. Embodiments using such changes are comprehended by the teachings of the disclosed flow 600.

In various embodiments, when a central control facility (e.g., by inspection of electronic records) of a smart grid network determines that a smart meter (and/or group of neighboring smart meters) has not sent (and/or responded to) communications to (and/or from) the central control facility, the central control facility can instruct smart meters in the neighborhood to perform the communication-based physical media monitoring (e.g., flow 600) on neighboring nodes. The neighboring nodes "neighbor" other neighboring on a node-wise basis (e.g., in accordance with physical media connecting/coupling adjacent nodes as neighbors). Accordingly, the neighboring nodes are usually geographically situated closely to other nodes closely coupled in a network (such as smart meters within a particular housing development).

In various embodiments, smart meters in the neighborhood are preprogrammed to perform the communication-based physical media monitoring on neighboring nodes. For example, the smart meters can perform the flow 600 in response to each packet received from a neighboring node. Likewise, the smart meters can periodically "ping" neighboring nodes to monitor each network path between the pinging node and the neighbor node being pinged. Further, a first smart meter can request/instruct a neighboring smart meter to perform the flow 600 with respect to communications from the neighboring node to the first smart meter (e.g., such that two-way communication-based physical media monitoring is performed). Each node is typically capable of forwarding communication-based physical media monitoring results received from a first node to a second node (and, ultimately, forwarded to a gateway of the central control facility for processing by the associated utility).

In various embodiments, the frequencies of performing the flow 600 can be increased or decreased in accordance with indications generated in response to results determined by performing the flow 600. For example, the frequency of initiation and execution of a flow 600 can be increased in accordance with an indication of low signal strength to generate an increased sample set. The increased data sample set can be used (e.g., by the related central control facility) to isolate fault locations, to predict a future failure date, and/or to schedule maintenance actions upon the indicated path between two nodes. The increased data sample set includes two-way information between (for example) adjacent nodes such that signal strength differences between the forward (e.g., "from") and the reverse (e.g., "to") signal-strength metrics can be used in fault isolation. Further, signal strength data from the increased sample set can be correlated with weather records such that water-intrusion-related underperformance problems can be more easily identified and/or fixed.

Figure 7:
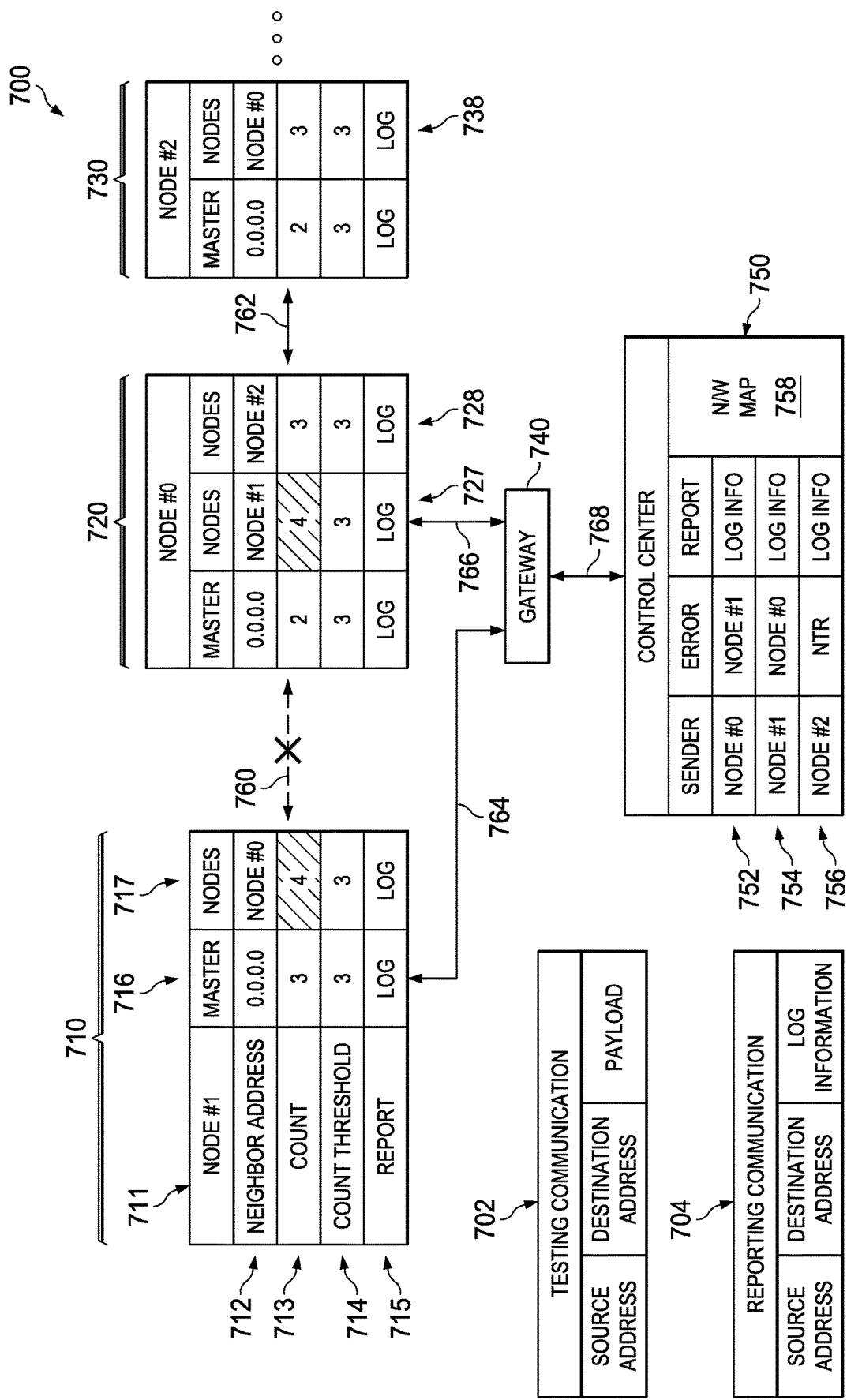
FIG. 7 is a data flow diagram illustrating communication-based physical media monitoring between various nodes in accordance with various embodiments of the disclosure.

FIG. 7 is a data flow diagram illustrating communication-based physical media monitoring between various nodes in accordance with various embodiments of the disclosure. Network diagram 700 includes smart meters 710, 720, and 730, gateway 740, and control center 750. The smart meters 710, 720, and 730 can be arranged similarly with respect to smart meters 512, 522, and 542 discussed above. (For the purpose of illustration, the smart meters 710, 720, and 730, gateway 740, and control center 750 are representative and are not limiting with respect to the illustrated numbers of such components.)

Smart meter 710 is bidirectionally coupled to smart meter 720 via physical medium 760 (which is illustrated as a malfunctioning connection), and smart meter 720 is bydirectionally coupled to smart meter 730 via physical medium 762. Smart meters 710 and 720 are bidirectional coupled to the gateway 740 via physical media 764 and 766. "Bidirectional coupling" includes the meaning of a transmitter and receiver of a first node being coupled respectively to a receiver and a transmitter of a second node.

The physical media 760 and 762 are typically power lines used for power line communications between smart meters of a network (e.g., smart grid) for performing communication-based physical media monitoring. The physical media 764 and 766 are also typically power lines through which communication-based physical media monitoring is used, but can be replaced by high-speed, long distance physical media when such media are conveniently available and/or easily maintained.

Smart meter 730 is not directly coupled to the gateway 740 and, instead, indirectly communicates with the gateway 740 via forwarding operations performed by physical medium 762, smart meters 720 and physical medium 766. Accordingly, each smart meter is normally capable of receiving packets communications from another smart meter and forwarding the received packet communications to yet another smart meter and/or the gateway 740. Likewise, the gateway 740 is normally capable of communications with any smart meter (e.g., on the network grid) via such forwarded communications.

The gateway 740 is coupled to the control center 750 via physical medium 768. The physical medium 768 is typically a trunk line (e.g., a high speed, high-capacity communication link) adapted to carry a high volume of communications between the smart meters and the control center. The control center 750 is, for example, a central control facility of a utility for monitoring smart meters of a smart grid and for performing maintenance on the smart meters and physical media coupled between the smart meters.

Multiple central control facility and gateways can be in arranged in various locations to provide redundancy, convenient access, and fault isolation. For example, the redundancy of the additional provide access to nodes that would otherwise be inaccessible when a gateway (or links to the gateway) are broken or inaccessible. The additional access points provide additional fault-isolation information where nodes (and/or a group of nodes) is otherwise inaccessible.

Smart meter 710 includes information for performing communication-based physical media monitoring. Such information includes a node address (Node #1) 711 for the smart meter 710 itself, a set 716 of fields for monitoring communications with the control center (Master) 750, and one or more sets 717 of fields for monitoring communications with other (one or more) smart meters (such as Node #0). For example, testing communication 702 is a packet (which includes information fields such as a source address, a destination address, and payload data) to be sent from one smart meter to another in accordance with the node addresses stored in a field of set 717.

In a similar manner, smart meter 720 includes a node address (Node #0) for the smart meter 720 itself, a set of fields for monitoring communications with the control center (Master) 750, and a set 727 of fields for monitoring communications with Node #1 and a set 728 of fields for monitoring communications with Node #2. Other nodes include similar fields, such as smart meter 730, which includes node address (Node #2) for the smart meter 720 itself, a set of fields for monitoring communications with the control center (Master) 750, and a set 738 of fields for monitoring communications with Nodes #2.

Accordingly, each set of fields for monitoring communications with a master or other node contains a field for storing information pertaining to communications monitored between the master and other nodes (which are typically neighboring nodes). For example, the neighborhood address 712 is a field for storing a network address (and/or node number or other identifier) for a node to be monitored. As illustrated, smart grid 710 is arranged to monitor physical media respectively between itself and the master and between itself and the node #0.

The count 713 is a field for storing the total of the number of comparisons where an indication (e.g., a windowed average) of the reported signal strength for a received packet is below a signal-strength threshold. Additional signal-strength comparisons are made and the current total of the number of comparisons where the indication is below the signals for a threshold is stored in the count 713 field. When the count 713 field exceeds the count threshold 714 field, reports the "error" (e.g., the condition where the count 713 field exceeds a count threshold 714 field) to the master and logs information related to the error in report 715 field.

For example, physical medium 760 is illustrated as being "broken," which results in the count 713 field (of the set 717 of fields pertaining to node #0) to exceed the count threshold 714 field. Accordingly, smart meter 710 reports the "error" by sending a reporting (e.g., error notification) communication 704 containing information related to the error to the master. The reporting communication includes information such as the node address of itself (e.g., node #1), the node address (Node #0) of the destination to which the monitored physical medium pertains, and log information (e.g., from the report 715 of set 717) such as time, date, temperature, humidity, signal-strength threshold, count threshold, and the like associated with quantities and indications used to perform the signal-strength measurements and/or comparisons.

In a similar manner, smart meter 720 (node #0) determines that a smart meter 710 (node #1) is not properly responding when for example, the count 713 field (of set 727) exceeds the count threshold 714 field (of set 727). In response to the determination, the smart meter 720 (e.g., also) sends an error notification communication to the master. The error notification communication also includes information such as the node address of itself (e.g., node #0), the node address (Node #1) of the destination to which the monitored physical medium pertains, and log information such as time, date, temperature, humidity, signal-strength threshold, count threshold, and the like associated with quantities and indications used to perform the signal-strength measurements and/or comparisons.

In the example where the physical medium 760 is broken, and control center 750 logs the received error notification communications. The error notification communication received from the smart meter 710 is logged (e.g., stored) with reference to the indication 754 of the address for Node #1 (which is the address for smart meter 710). The error notification communication received from the smart meter 720 is logged (e.g., stored) with reference to the indication 752 of the address for Node #0 (which is the address for smart meter 720). Because no error notification communication has been received from the smart meter 730, no error exists to report (NTR), and no error has been associated in the log with the indication 756 of the address of Node #2 (smart meter 730).

The control center 750 (e.g. periodically and/or in response to one or more received error notification communications) determines, for example, whether all nodes of a smart grid are capable of sending error notifications to the control center (which might occur due to malfunctioning physical media). The control center 750 can traverse the network (N/W) map 758 to determine whether any known errors would block communications between any node and the control center (e.g., which potentially could result in a log that did not contain all error conditions related to errors detectable by performing communication-based physical media monitoring).

Likewise, the control center 750 can instruct any (or all) nodes to perform communication-based physical media monitoring on neighboring nodes and to report the results (e.g., including all results regardless whether an error is encountered) back to the control center 750. For example, the smart meter 730 does not detect an error (e.g., due to the absence of an error) and sends an NTR (nothing to report) communication to the control center 750, which is logged as an "NTR" by the control center 750. The NTR communication is logged in association with the indication 756 of the address of Node #2 (smart meter 730).

The control center 750 uses the logged information (which potentially can include either or both "errors" and "NTRs") to traverse the network map 758 to determine areas requiring (and/or likely to soon or eventually require) maintenance and/or inspection. When the control center 750 determines that one or more areas require such maintenance and/or inspection, the control center 750 provides an indication to other computers or operators of the utility (e.g., which owns and/or operates the smart meters) of areas containing physical media to be maintained and/or inspected. The indication information can include scheduling information (e.g., determined in response to priorities in accordance with comparison of relative magnitudes of signal-strengths reported in various error notification communications) and work orders based on geographical information (e.g., derived from the network map 758) for convenience in efficiently performing such maintenance and/or inspection by (for example) technicians of the utility.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:
1. A method comprising:
receiving, via an interface, a set of packets;
determining a signal-to-noise ratio (SNR) of a respective packet of the set of packets;
determining a received signal strength index (RSSI) of the respective packet;
determining an indication of signal strength (S) of the respective packet based on an equation:

$$S = \frac{SNR}{1 + SNR} RSSI;$$

determining a set of averages of the indications of signal strength of the set of packets;
determining a first count of a first subset of the set of averages that fails a comparison to a first signal strength threshold;
comparing the first count to a first count threshold, wherein at least one of the first signal strength threshold or the first count threshold corresponds to a first type of fault; and
determining, based on the comparing of the first count to the first count threshold, whether the first type of fault occurred.

2. The method of claim 1 further comprising selecting at least one of: a number of packets associated with each average of the set of averages, the first signal strength threshold, or the first count threshold based on a property of a physical medium.

3. The method of claim 1 further comprising:
selecting a number of packets associated with each average of the set of averages based on an error type of a physical medium to be detected.

4. The method of claim 1 further comprising providing a packet that specifies a quality metric of a physical medium.

5. The method of claim 4, wherein the set of packets is received from a first network node, and the provided packet specifies the first network node from which the set of packets is received.

6. The method of claim 4, wherein the provided packet specifies at least one of: the first signal strength threshold or the first count threshold.

7. The method of claim 1, comprising:
determining a second count of a second subset of the set of averages that fails a comparison to a second signal strength threshold;

comparing the second count to a second count threshold, wherein at least one of the second signal strength threshold or the second count threshold corresponds to a second type of fault; and determining, based on the comparing of the second count to the second count threshold, whether the second type of fault occurred.

8. The method of claim 7, wherein:
the second signal strength threshold is different from the first signal strength threshold;
the second count threshold is different from the first count threshold; and
the second type of fault is different from the first type of fault.

9. The method of claim 1, wherein the determining of the SNR of the respective packet and the determining of the RSSI of the respective packet include querying the interface for indications of the SNR and the RSSI of the respective packet.

10. A device comprising:
at least one processor; and
a non-transitory computer readable storage medium coupled to the at least one processor and storing instructions that, when executed, cause the at least one processor to:
receive a set of packets over a communication medium;
determine a signal-to-noise ratio (SNR) of a respective packet of the set of packets;
determine a received signal strength index (RSSI) of the respective packet;
determine an indication of signal strength (S) of the respective packet based on an equation:

$$S = \frac{SNR}{1+SNR} RSSI;$$

determine a set of averages of the indications of signal strength of the set of packets;
determine a first count of a first subset of the set of averages that fails a comparison to first a signal strength threshold;
compare the first count to a first count threshold, wherein at least one of the first signal strength threshold or the first count threshold corresponds to a first type of fault; and
determine, based on the comparing of the first count to the first count threshold, whether the first type of fault occurred.

11. The device of claim 10, wherein the instructions cause the at least one processor to select at least one of: a number of packets associated with each average of the set of averages, the first signal strength threshold, or the first count threshold based on a property of the communication medium.

12. The device of claim 10, wherein the instructions cause the at least one processor to:
select a number of packets associated with each average of the set of averages based on an error of the communication medium to be detected.

13. The device of claim 10, wherein the instructions cause the at least one processor to provide a packet that specifies a quality metric of the communication medium.

14. The device of claim 13, wherein the set of packets is received from a first network node, and the provided packet specifies the first network node from which the set of packets is received.

15. The device of claim 13, wherein the provided packet specifies at least one of: the first signal strength threshold or the first count threshold.

16. The device of claim 10, wherein the instructions cause the at least one processor to:
determine a second count of a second subset of the set of averages that fail a comparison to a second signal strength threshold;
compare the second count to a second count threshold, wherein at least one of the second signal strength threshold or the second count threshold corresponds to a second type of fault; and
determine, based on the comparing of the second count to the second count threshold, whether the second type of fault occurred.

17. The device of claim 16, wherein:
the second signal strength threshold is different from the first signal strength threshold;
the second count threshold is different from the first count threshold; and
the second type of fault is different from the first type of fault.

18. The device of claim 10, wherein the instructions that cause the at least one processor to determine the SNR of the respective packet and to determine of the RSSI of the respective packet cause the at least one processor to provide a query to an interface coupled to the communication medium for indications of the SNR and the RSSI of the respective packet.

* * * * *